United States Patent [19]
Laggy et al.
[11] 3,710,025
[45] Jan. 9, 1973

[54] TIME SLOT MEMORY CIRCUIT

[75] Inventors: William Joseph Laggy, Middletown, N.J. 07748; Harold Frederick May, Holmdel, N.J. 07733

[73] Assignee: Bell Telephone Laboratories Inc., Murray Hill, Berkeley Heights, N.J.

[22] Filed: Sept. 21, 1971

[21] Appl. No.: 182,373

[52] U.S. Cl. ................................................179/15 A
[51] Int. Cl. ................................................H04j 3/12
[58] Field of Search .179/15 AT, 18 AF, 18 ES, 18 J, 179/27 D, 27 DB, 1 B, 15 AQ, 18 GF, 15 A, 15 R; 307/232, 269

[56] References Cited

UNITED STATES PATENTS

| | | | |
|---|---|---|---|
| 3,105,878 | 10/1963 | Frankel | 179/15 AT |
| 3,315,232 | 4/1967 | Feder | 179/18 GF |
| 3,458,659 | 7/1969 | Sternung | 179/15 AQ |
| 2,932,013 | 4/1960 | Sager | 179/15 A |
| 3,334,189 | 8/1967 | Soos | 179/15 A |

*Primary Examiner*—Kathleen H. Claffy
*Assistant Examiner*—David L. Stewart
*Attorney*—R. J. Guenther et al.

[57] ABSTRACT

We disclose a dynamic time slot memory circuit for use in a time division switching system. This memory circuit is responsive to an input pulse in a time slot to thereafter provide output pulses in that time slot at the system frame rate. An oscillator is utilized as the memory element to remember the system sampling frequency. The output of a monostable multivibrator triggered by the input pulse, the output of a system clock providing pulses defining time slots, and a positive zero-crossing of the oscillator output are combined to provide an output pulse during the next frame in the time slot in which the input pulse occurred. This output pulse is fed back as an input to the time slot memory circuit to restart the cycle.

7 Claims, 3 Drawing Figures

TIME SLOT MEMORY CIRCUIT

BACKGROUND OF THE INVENTION

This invention relates to time division multiplex systems and, in particular, to circuitry for storing assigned time slot information.

In a time division multiplex switching system, circuit elements are connected to a transmission bus for very short periods of time in distinct time slots of a repetitive cycle. Elements to be connected to each other share the transmission bus during the same time slot. It is therefore necessary that such a system include some sort of memory to store information as to the elements connected to the transmission bus during the different time slots. When the switching system is under the control of a central processing unit, the memory of the central processing unit can be utilized to store such information. However, in a system such as that disclosed in our copending application (Case 1–7), Ser. No. 182,364, filed on even date herewith, there is no central processing unit. In that system, each circuit element is permanently assigned a particular time slot for transmission. For reception, the element utilizes the assigned time slot of the element to which it is connected. A system clock and time slot generator provide each circuit element with clock pulses defining all the time slots and with pulses in the time slot assigned to that element for transmission purposes. It is therefore necessary for each circuit element of the time division system disclosed in the aforementioned application to have a memory for storing the time slot utilized by that element for reception.

SUMMARY OF THE INVENTION

In accordance with principles illustrative of this invention, circuitry is advantageously provided which is responsive to a single input pulse in any time slot for thereafter providing output pulses in that time slot. This circuitry utilizes an oscillator to remember the system sampling frequency. A positive zero-crossing of the output of the oscillator is combined with the output of the system clock which provides pulses defining the system time slots to provide an output pulse during the next frame in the time slot in which the input pulse occurred. This output pulse is fed back as an input to the circuitry to restart the cycle.

More specifically, in one illustrative embodiment of our invention a combining gate is provided having as its inputs the system clock pulses, the oscillator output, and the output of a disabling circuit. A further input to the combining gate is provided by a delay circuit which insures against spurious operations. In accordance with one aspect of our invention the oscillator operates at a multiple of the system sampling frequency, which defines the system cycles, and the disabling circuit, which may advantageously be a monostable multivibrator, provides a disabling input to the combining circuit except during the last half cycle of oscillation of the oscillator just prior to the occurrence of the particular time slot being stored in the memory circuit and in which time slot an output pulse is to occur.

In accordance with another aspect of our invention a voltage level shifter is connected between the oscillator and the combining circuit input. Accordingly, at the positive zero-crossing of the output of the oscillator, the voltage shifter will shift this voltage to the required input level for the combining gate. Further in accordance with an aspect of our invention the oscillator is clamped at this time for the duration of the desired output pulse. Advantageously we attain this clamping by providing an oscillator clamp circuit which is enabled by a feedback path from the output of the combining circuit.

DESCRIPTION OF THE DRAWING

The foregoing will be more readily understood upon a reading of the following description in conjunction with the drawing in which.

GENERAL DESCRIPTION

Figure 1:
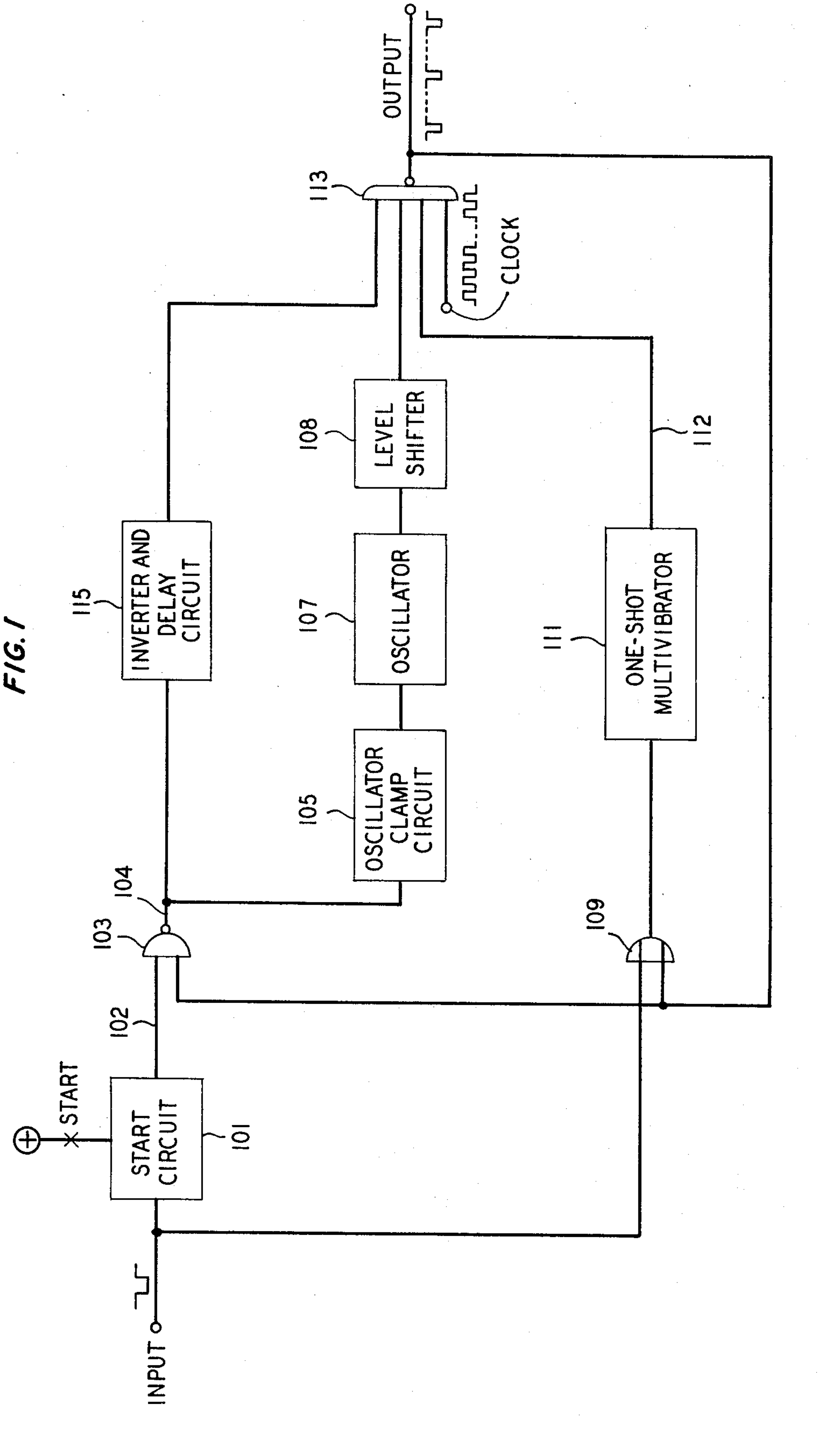
FIG. 1 depicts a schematic block diagram of a circuit embodiment which operates in accordance with the principles of this invention.

When it is desired to enable the circuit of FIG. 1 in order to store time slot information, power is applied to start circuit 101 through symbolic switch START. Initially, oscillator 107 is clamped off by oscillator clamp circuit 105 and one-shot multivibrator 111 is in a reset state with lead 112 being high. The OUTPUT of gate 113 is normally high, enabling NAND gate 103 and OR gate 109. When a low pulse arrives at INPUT during a particular time slot, this pulse is transmitted through gate 109 and its trailing edge sets one-shot multivibrator 111, thereby placing a low signal on lead 112 to gate 113. The low pulse at INPUT activates start circuit 101 which places a high signal on lead 102. This high signal remains on lead 102 until power is removed from start circuit 101 by the opening of switch START. Since both inputs of NAND gate 103 are high, a low signal is generated on lead 104. This low signal turns off oscillator clamp circuit 105 which allows oscillator 107 to begin its sinusoidal oscillations. The frequency of oscillation of oscillator 107 is chosen to be N times the system sampling frequency so that N cycles of oscillation define a single frame. As will become evident from the following discussion, the frequency of oscillator 107 could be equal to the system sampling frequency but is chosen to be a multiple thereof so that a steep zero-crossing is obtained. The sinusoidal oscillations of oscillator 107 are applied as an input to level shifter 108. Level shifter 108 is arranged so that its output goes positive as the output of oscillator 107 approaches zero. At the end of the Nth cycle of oscillation, the output of level shifter 108 goes positive before the clock pulse defining the time slot during which the input pulse occurred but after the immediately preceding clock pulse.

Multivibrator 111 is arranged to remain set for (2N−1a)/2 cycles of oscillation of oscillator 107 and to reset itself during the negative portion of the Nth cycle of oscillation. Therefore, for the first (2N−1)/2 cycles of oscillation of oscillator 107, gate 113 would have been enabled whenever a clock pulse coincided with any positive portion of the oscillations, except for the set condition of multivibrator 111 which disables gate 113. When the output of oscillator 107 causes level shifter 108 to produce a positive voltage immediately preceding the end of the Nth cycle, all conditions are met to enable gate 113 upon arrival of a clock pulse. The next clock pulse to arrive will be the one defining the time slot during which the input pulse appeared. When this clock pulse arrives, gate 113 provides a pulse on lead OUTPUT whose width is the width of the clock pulse. This output pulse is fed back to clamp the oscillator for the duration of the pulse. Even though the output of oscillator 107 is clamped during the clock pulse, the output of level shifter 108 remains sufficiently high to keep gate 113 enabled. The purpose of inverter and delay circuit 115 is to enable gate 113 after an initial delay when start circuit 101 is activated and also to prevent the feedback of the pulse at the output of gate 113 from immediately disabling gate 113. When the output pulse ends, the oscillator is again unclamped, the multivibrator is set, and the foregoing cycle repeats. Thus, every N cycles of the oscillator a pulse is generated in the same time slot that the original input pulse occurred. This output pulse generation will continue until power is removed from start circuit 101.

DETAILED DESCRIPTION

Figure 2:
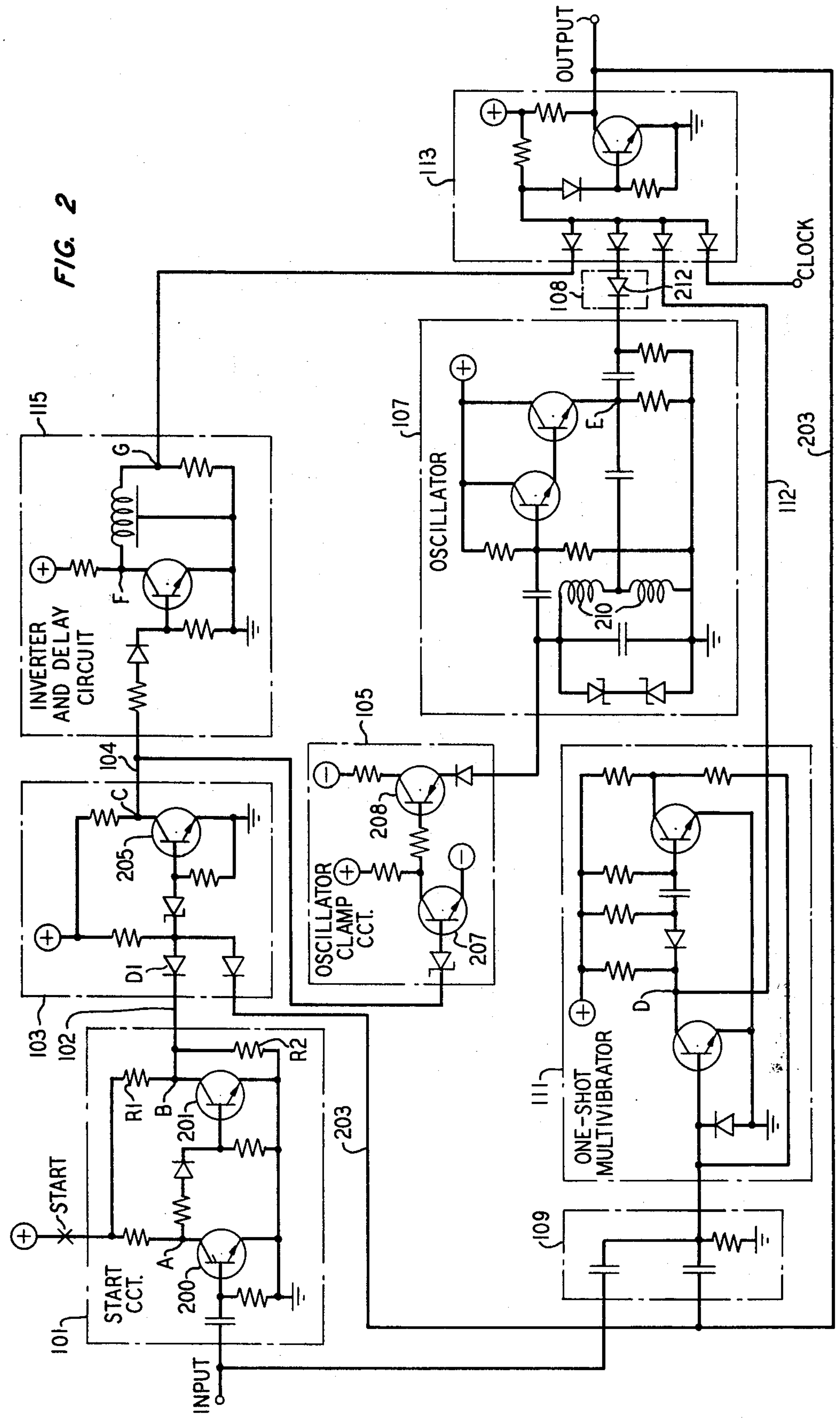
FIG. 2 depicts an illustrative detailed circuit schematic diagram of the circuit of FIG. 1.
Figure 3:
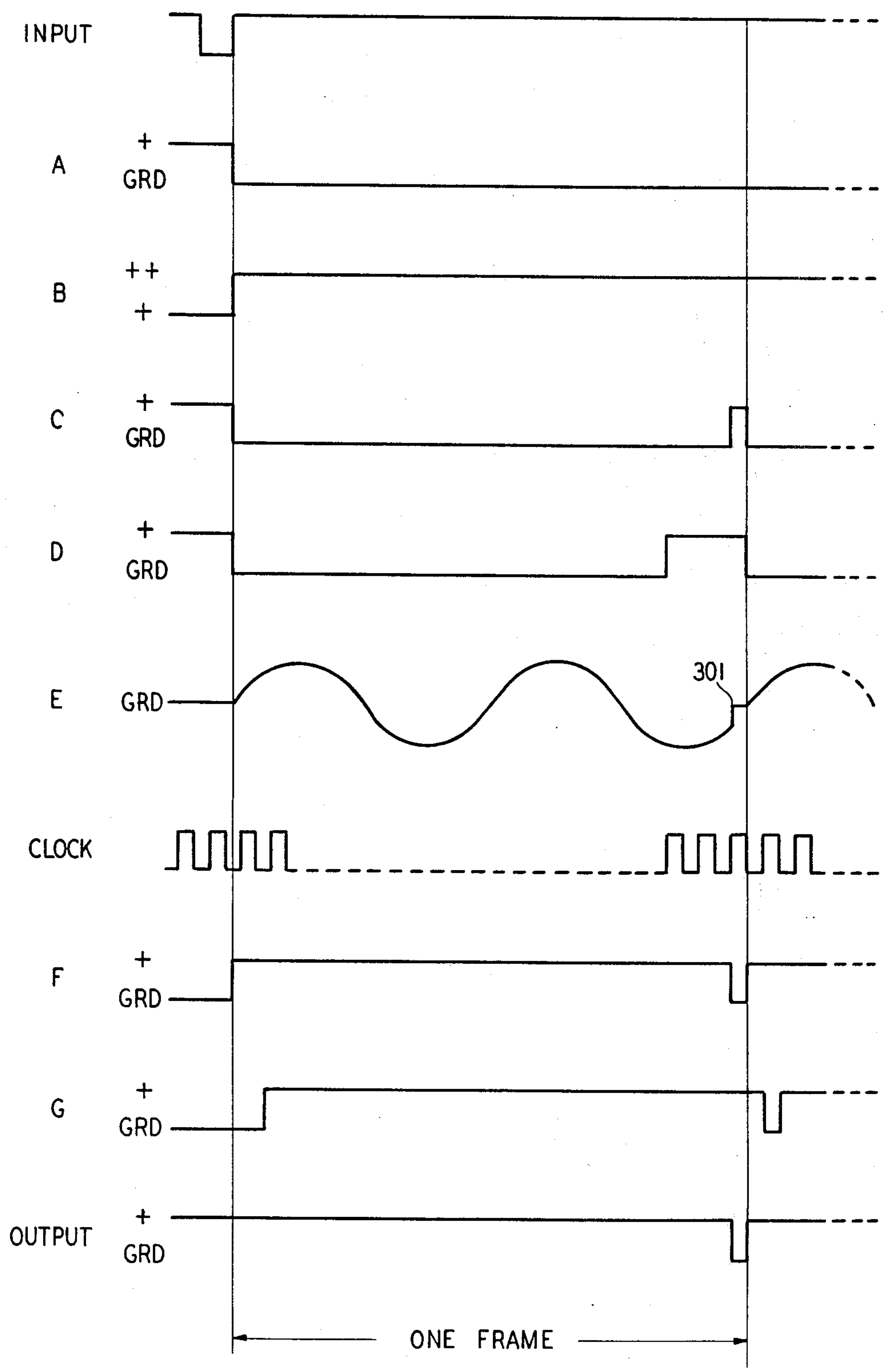
FIG. 3 depicts voltage waveforms at various points in the circuit of FIG. 2.

Turning now to FIG. 2, start circuit 101 illustratively includes a differentiating circuit connected to the input of a PNPN switch 200 whose output drives an inverter circuit. Thus, when a negative pulse appears at the INPUT after power is applied to start circuit 101 through the START contact, the trailing edge of the pulse turns on the PNPN switch 200, thereby changing the voltage at point A from a relatively high voltage to ground, as illustrated in FIG. 3. This change in voltage at point A turns off the transistor 201 in start circuit 101, which transistor 201 had been initially on, thereby raising the voltage at point B, as illustrated in FIG. 3. Resistors R1 and R2 are chosen such that both before and after power is applied to start circuit 101, the voltage at point B is insufficient to reverse bias diode D1 in NAND gate 103 and also such that after the pulse at INPUT the voltage at point B is sufficient to reverse bias diode D1.

Initially, the OUTPUT of NAND gate 113 is at a high level. This OUTPUT is applied by lead 203 as one of the inputs to NAND gate 103. The other input to NAND gate 103 is the output of start circuit 101. At the end of the INPUT pulse, both of these inputs to NAND gate 103 are high. This causes transistor 205 in NAND gate 103 to be turned on, thereby dropping the voltage at point C to ground, as illustrated in FIG. 3. When the INPUT pulse appeared, this pulse was differentiated by circuit 109 and its trailing edge caused one-shot multivibrator 111 to be set, lowering the voltage at point D, as illustrated in FIG. 3, and thereby disabling NAND gate 113.

When the output of NAND gate 103 was initially high, this caused both transistors 207 and 208 in oscillator clamp circuit 105 to be turned on, thereby drawing a constant current through the inductor 210 of the L-C network in oscillator 107. This constant current prevents oscillator 107 from oscillating, keeping point E at ground. Upon the occurrence of the trailing edge of the INPUT pulse, the voltage at point C goes to ground. This causes the transistors 207 and 208 of oscillator clamp circuit 105 to turn off, thereby allowing oscillator 107 to begin oscillating. The waveform of the voltage at point E is illustrated in FIG. 3. Level shifter circuit 108 is illustratively a diode 212 with a high forward voltage. Such a diode is described in The Bell System Technical Journal, Volume 43, No. 5, part 1, Sept. 1964, page 2065. The purpose of this level shifter will be more readily apparent as the discussion progresses.

Oscillator 107 is illustratively chosen to oscillate at twice the system sampling frequency so that two cycles of oscillation encompass a single time division frame of the system. One-shot multivibrator 111 is designed to reset during the negative portion of the second cycle of oscillation of oscillator 107. Therefore, the voltage at point D, and hence on line 112, will be low during all positive voltages of point E and will only be high while the voltage at point E is negative just before the end of the second cycle of oscillation.

The CLOCK input to NAND gate 113 is illustrated in FIG. 3. This input comprises a continuous train of regularly spaced pulses where the pulses define the time slots of the system.

The fourth input to NAND gate 113 is the output of inverter and delay circuit 115. This latter output is simply the inverted output of gate 103 delayed by a time interval which is small in comparison with the time interval of a single frame. The voltages at points F and G in inverter and delay circuit 115 are illustrated in FIG. 3.

To reiterate, the inputs to NAND gate 113 are the output of inverter and delay circuit 115, the output of level shifter 108, the output of one-shot multivibrator 111, and the CLOCK. The output of gate 113 is normally high and only goes low when all of the inputs to gate 113 are high. Since one-shot multivibrator 111 is arranged to have a low output for one and a half cycles of oscillation of oscillator 107, NAND gate 113 is disabled during this time. The output of one-shot multivibrator 111 goes high during the negative portion of the second cycle of oscillation. However, during this time, NAND gate 113 is disabled because the output of oscillator 107 through level shifter 108 is negative. The diode 212 comprising level shifter 108 is chosen so that its forward voltage is sufficient to make its input to gate 113 positive as the output of oscillator 107 approaches zero before the clock pulse defining the time slot during which the INPUT pulse appears but after the immediately preceding clock pulse. Choosing the frequency of oscillator 107 to be twice the system sampling frequency gives a sufficiently steep zero-crossing to accomplish this. Therefore, when the clock pulse defining the time slot in which the INPUT pulse appeared arrives at the input of NAND gate 113, all other inputs of NAND gate 113 are high and the OUTPUT of NAND gate 113 is a low pulse equal in duration to the duration of the clock pulse, as illustrated in FIG. 3. This output pulse is fed back over lead 203 to NAND gate 103 to clamp the oscillator and to reset one-shot multivibrator 111, thereby restarting the above-described cycle of oscillations.

When the OUTPUT pulse occurs and is fed back, over lead 203, to NAND gate 103 and oscillator clamp circuit 105, the oscillator 107 is clamped for the duration of the clock pulse at ground level, as indicated by waveform portion 301 of the waveform at point E. It should be remembered that the waveform at point E is the output of the oscillator 107. The input from the oscillator 107 to the output NAND gate 113 is shifted in voltage from the voltage at point E by the level shifter circuit 108.

Accordingly, an OUTPUT pulse will be generated once per frame in the time slot during which the INPUT pulse appeared. This generation will continue until power is removed from start circuit 101 by the opening of symbolic switch START, thereby disabling output gate 113 and clamping oscillator 107.

What is claimed is:

1. In a time division system, a time slot memory circuit responsive to an input pulse in a time slot for thereafter providing output pulses in that time slot comprising an oscillator operating at a multiple of the system sampling frequency and started in response to an input pulse, and means for combining a positive zero crossing of the oscillator output with the output of a clock providing pulses defining system time slots to generate an output pulse in the time slot during which the input pulse occurred, said output pulse being fed back as an input to the memory circuit.

2. The time slot memory circuit of claim 1 wherein said combining means includes voltage level shifting means connected to said oscillator.

3. The time slot memory circuit of claim 2 wherein said combining means further includes circuitry arranged to disable said combining means except during the last half cycle of oscillation of said oscillator prior to the occurrence of said input pulse time slot.

4. In a time division system, a time slot memory circuit activated by an input pulse in a time slot for thereafter providing output pulses at the system frame rate in the time slot during which the input pulse occurs comprising a gate having a first input, a second input and a third input, and an output over which said output pulses are provided, said first input being connected to a clock which supplies pulses defining time slots, an oscillator operating a N times the system sampling frequency, means connecting said oscillator to said second gate input, a monostable multivibrator having an input and an output, said multivibrator output being connected to said third gate input, said multivibrator being arranged to provide a pulse at said multivibrator output which disables said gate for (2N−1)/2 cycles of said oscillator after a pulse at said multivibrator input, clamping means having an input, said clamping means being connected to said oscillator and responsive to a signal on said clamping means input for clamping said oscillator for the duration of said signal, and means for applying said input pulse and said output pulses to said clamping means input and said multivibrator input.

5. A time slot memory circuit in accordance with claim 4 wherein said oscillator includes an L-C tank circuit and said clamping means is arranged to cause a constant current to flow through said tank circuit in response to a signal on said clamping means input.

6. A time slot memory circuit in accordance with claim 4 wherein said connecting means includes a level shifter connected between said oscillator and said second gate input, said level shifter being arranged so as to enable said second gate input when the output voltage of said oscillator is at a predetermined negative voltage.

7. A time slot memory circuit for providing pulses in a predetermined time slot in successive system cycles in a time division switching system having a predetermined sampling frequency and a system clock defining system time slots, the memory circuit comprising an oscillator operating at a multiple of the system sampling frequency and having an input and an output, combining means having an output and a plurality of inputs to one of which is connected the system clock, voltage level shifting means connecting said oscillator output to another of said combining means inputs, disabling means connected to a third of said combining means inputs for disabling said combining means except during the last half cycle of oscillation of said oscillator prior to the occurrence of the predetermined time slot, an oscillator clamp circuit connected to said oscillator input, and means connecting said combining means output to said oscillator clamp circuit.

* * * * *